United States Patent
Smemo et al.

(10) Patent No.: US 9,599,009 B2
(45) Date of Patent: Mar. 21, 2017

(54) REVERSIBLE MECHANICAL FAN

(71) Applicant: Deere & Company, Moline, IL (US)

(72) Inventors: Alfred Sigmund Smemo, Dubuque, IA (US); Steven Ryan Whiteman, Dubuque, IA (US); Ryan John Kruse, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 167 days.

(21) Appl. No.: 14/337,594

(22) Filed: Jul. 22, 2014

(65) Prior Publication Data

US 2016/0024991 A1    Jan. 28, 2016

(51) Int. Cl.

| | | |
|---|---|---|
| *F16H 9/00* | (2006.01) | |
| *F16H 59/00* | (2006.01) | |
| *F16H 61/00* | (2006.01) | |
| *F16H 63/00* | (2006.01) | |
| *F01P 5/04* | (2006.01) | |
| *F16H 9/04* | (2006.01) | |
| *F01P 7/04* | (2006.01) | |

(52) U.S. Cl.
CPC .............. *F01P 5/043* (2013.01); *F01P 7/046* (2013.01); *F16H 9/04* (2013.01)

(58) Field of Classification Search
CPC .......... F16H 3/00; F16H 2712/00; F16H 9/04; F25B 47/006; F60H 1/02
USPC ............................................................. 474/4
See application file for complete search history.

(56) References Cited

U.S. PATENT DOCUMENTS

| | | | | |
|---|---|---|---|---|
| 881,545 A | * | 3/1908 | Caps | F16H 3/0915 |
| | | | | 180/365 |
| 1,696,967 A | * | 1/1929 | Opferkuck | F16H 9/24 |
| | | | | 474/4 |
| 1,790,786 A | * | 2/1931 | Bailey | F16H 7/02 |
| | | | | 474/4 |
| 2,427,135 A | * | 9/1947 | Guier | B63H 23/00 |
| | | | | 474/4 |
| 2,431,580 A | * | 11/1947 | Orr | F16H 3/00 |
| | | | | 192/21 |
| 2,613,546 A | | 10/1952 | Jorgensen | |
| 2,653,490 A | * | 9/1953 | Testori | F16H 9/26 |
| | | | | 475/182 |
| 3,139,924 A | * | 7/1964 | Schreiner | F25B 13/00 |
| | | | | 165/43 |
| 3,276,281 A | | 10/1966 | Witt et al. | |
| 3,307,415 A | | 3/1967 | Dobbs | |
| 3,334,522 A | * | 8/1967 | Toffin | F16H 3/00 |
| | | | | 474/4 |

(Continued)

*Primary Examiner* — Henry Liu (57) ABSTRACT

A fan assembly may include an input shaft, first and second belts, first and second pulleys engaged by the first belt, third and fourth pulleys engaged by the second belt, output shaft rotationally coupled to a fan, and a clutch assembly. The second pulley may be rotationally coupled to the first pulley via the first belt so as to rotate in the same direction as the first pulley. The fourth pulley may be rotationally coupled to the third pulley via the second belt so as to rotate in the opposite direction of the third pulley. The clutch assembly may be configured to selectively rotationally couple the output shaft to the input shaft via the first pulley, first belt, and second pulley. The clutch assembly may also be configured to selectively rotationally couple the output shaft to the input shaft via the third pulley, second belt, and fourth pulley.

14 Claims, 7 Drawing Sheets

(56) References Cited

U.S. PATENT DOCUMENTS

| | | | | |
|---|---|---|---|---|
| 3,626,772 | A * | 12/1971 | Gutzmer | F16H 3/00 192/93 C |
| 4,002,251 | A * | 1/1977 | Burgess, Jr. | B65D 90/48 198/585 |
| 4,116,265 | A * | 9/1978 | Staebler | F01P 11/12 165/103 |
| 4,176,560 | A | 12/1979 | Clarke | |
| 4,634,403 | A * | 1/1987 | Peabody | F16H 9/02 474/1 |
| 6,468,170 | B1 | 10/2002 | Ito | |
| 6,659,894 | B2 * | 12/2003 | Kern | H02K 16/00 123/41.12 |
| 7,121,368 | B2 * | 10/2006 | MacKelvie | B60K 11/00 123/41.12 |
| 7,475,450 | B1 | 1/2009 | Ragner | |
| 8,408,188 | B1 | 4/2013 | Hormilla | |
| 8,967,092 | B1 * | 3/2015 | Jones | F04D 27/00 123/41.12 |
| 2009/0293512 | A1 * | 12/2009 | Miura | B60H 1/02 62/80 |
| 2011/0009225 | A1 * | 1/2011 | Husson | F01P 5/04 475/210 |
| 2011/0289946 | A1 * | 12/2011 | Miura | B60H 1/02 62/80 |

* cited by examiner

REVERSIBLE MECHANICAL FAN

FIELD OF THE DISCLOSURE

The present disclosure generally relates to a reversible mechanical fan assembly.

BACKGROUND

Work vehicles may include a fan to ventilate and cool the vehicle. Such a fan may be powered in a number of different manners, including through an electrical, hydraulic, or mechanical connection to the engine. Such a fan may also be designed to selectively reverse its rotational direction.

SUMMARY

According to an aspect of the present disclosure, a fan assembly may include an input shaft, a first belt, a first pulley, a second pulley, a second belt, a third pulley, a fourth pulley, an output shaft, a fan, and a clutch assembly. The first pulley may be engaged by the first belt. The second pulley may be engaged by the first belt and rotationally coupled to the first pulley via the first belt so as to rotate in the same direction as the first pulley. The third pulley may be engaged by the second belt. The fourth pulley may be engaged by the second belt and rotationally coupled to the third pulley via the second belt so as to rotate in the opposite direction of the third pulley. The fan may be rotationally coupled to the output shaft. The clutch assembly may be configured to selectively rotationally couple the output shaft to the input shaft via the first pulley, the first belt, and the second pulley. The clutch assembly may also be configured to selectively rotationally couple the output shaft to the input shaft via the third pulley, the second belt, and the fourth pulley.

According to another aspect of the present disclosure, a method of operating a fan assembly may include operating in a first fan mode where a first clutch rotationally couples an input shaft to a fan via a first pulley, a second pulley, a first belt, and an output shaft, the output shaft rotationally coupled to a fan, the first pulley rotationally coupled to the second pulley via the first belt so as to rotate in the same direction as the second pulley, and operating in a second fan mode where a second clutch rotationally couples the input shaft to the fan via a third pulley, a fourth pulley, a second belt, and the output shaft, the third pulley rotationally coupled to the fourth pulley via the second belt so as to rotate in the opposite direction as the fourth pulley.

According to another aspect of the present disclosure, a vehicle may include an engine, a fan, a first belt, a second belt, a first clutch, and a second clutch. The engine may be rotationally coupled to a first pulley and a second pulley. The fan may be rotationally coupled to a third pulley and a fourth pulley. The first belt may include a first side and a second side opposite the first side. The first pulley and the third pulley may be engaged by the first side of the first belt. The second belt may include a first side and a second side opposite the first side. The second pulley may be engaged by the first side of the second belt. The third pulley may be engaged by the second side of the second belt. The first clutch may be configured to selectively rotationally couple the engine to the fan via the first pulley, the first belt, and the third pulley. The second clutch may be configured to selectively rotationally couple the engine to the fan via the second pulley, the second belt, and the fourth pulley.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
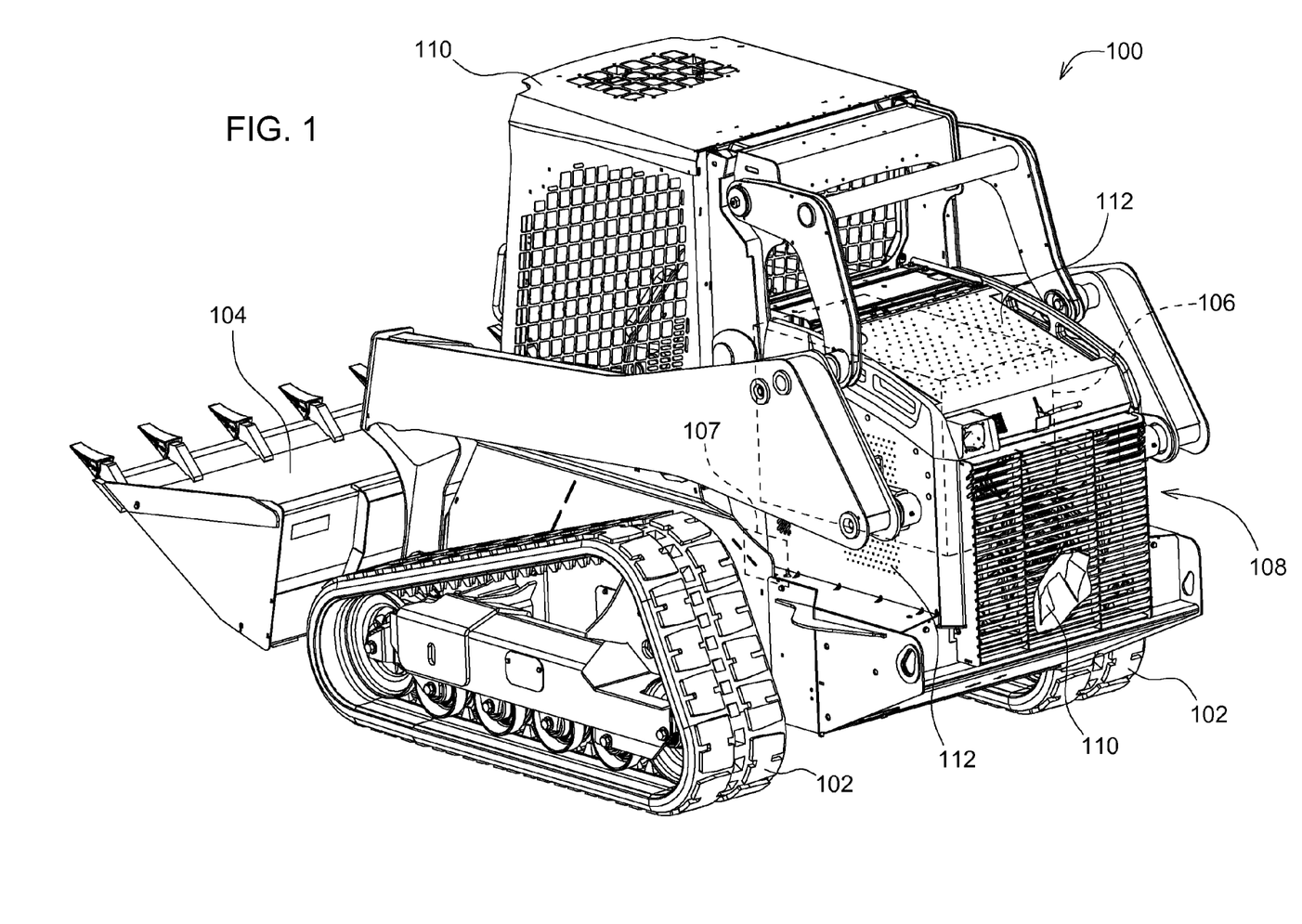
FIG. 1 is a perspective view of a work vehicle.

FIG. 1 illustrates work vehicle 100, having tracks 102, work tool 104, engine 106, cooling package 108, and operator station 110. Work vehicle 100 is illustrated as a compact track loader, but may be any work vehicle with a fan, such as an articulated dump truck, backhoe loader, crawler, excavator, forwarder, harvester, haul truck, knuckleboom loader, motor grader, skid steer loader, skidder, sprayer, telehandler, tractor, or wheel loader, to name a few examples. Directions with regard to work vehicle 100 may be referred to with respect to an operator seated within operator station 110: the left of work vehicle 100 is to the left of such an operator, the right of work vehicle 100 is to the right of such an operator, the front of work vehicle 100 is the direction such an operator faces, the rear of work vehicle 100 is behind such an operator, the top of work vehicle 100 is above such an operator, and the bottom of work vehicle 100 is below such an operator.

Work vehicle 100 may be controlled by an operator located in operator station 110. The operator may command movement of work vehicle 100 which is achieved through the movement of tracks 102. The rotation of tracks 102 in the same direction and at the same speed may propel work vehicle 100 forward or backward, and the rotation of tracks 102 at different speeds and/or different directions may propel work vehicle along an arc or may turn work vehicle 100 in place. The operator may also command the movement of work tool 104, which is achieved through the actuation of hydraulic cylinders connected to work tool 104 and/or portions of the multi-member linkage which connects work tool 104 to the remainder of work vehicle 100. These hydraulic cylinders may be actuated by pressurized hydraulic fluid received from a hydraulic control valve. The hydraulic control valve may receive pressurized hydraulic fluid from a hydraulic pump, and may meter such pressurized hydraulic fluid out to one or more hydraulic functions, such as one for raising or lowering work tool 102 (e.g., boom raise/lower) or one for rotating work tool 102 (e.g., bucket curl/dump).

The hydraulic pump and other components on work vehicle 100 may be powered by engine 106, which may be a diesel engine. For example, engine 106 may be rotationally coupled to the hydraulic pump so as to turn the hydraulic pump and thereby generate pressurized hydraulic fluid. As another example, engine 106 may be rotationally coupled to a transmission system (e.g., mechanical, hydraulic, electrical) which transfers power from engine 106 to one or more ground engaging elements (e.g., tracks 102). As another example, engine 106 may be rotationally coupled to cooling package 108 so as to drive fan 110. Engine 106 may be controlled in part by controller 107.

Controller 107, which may also be referred to as a vehicle control unit (VCU), may be in communication with engine 106, cooling package 108, and operator station 110, such as through other controllers and user inputs. Controller 107 may be electrically connected to these other components by a wiring harness such that messages, commands, and electrical power may be transmitted between controller 107 and the remainder of work vehicle 100. For example, controller 107 may be connected with an engine control unit (ECU) through a Controller Area Network (CAN). Controller 107 may then send commands over the CAN to the ECU, and the ECU in turn may receive these commands and actuate solenoids or other components to control engine 106 based on such commands.

The operation of work vehicle 100, including power generation (e.g., engine 106), hydraulic (e.g., actuation of work tool 104), mechanical, electrical (e.g., controller 107), heating, cooling, and ventilation systems on work vehicle 100, may generate heat that work vehicle 100 must dissipate. Cooling package 108 may aid in the dissipation of this heat by utilizing fan 110 to cause airflow over or through one or more heat exchangers. These heat exchangers may carry various fluids, such as engine coolant, engine oil, transmission fluid, axle fluid, hydraulic fluid, air conditioning fluid, or air, to name but a few possible fluids, and permit the transfer of heat from these fluids to the air surrounding the heat exchanger. Cooling package 108 may include a separate heat exchanger for each fluid for which cooling is desired or it may include one or more heat exchangers capable of transferring heat from more than one fluid type to the surrounding air. For example, the rotation of fan 110 in a first direction may draw air from the environment surrounding work vehicle 100 into inlets 112, through heat exchangers, through fan 110, and out the rear of work vehicle 100. When fan 110 is operating in this manner, it may be referred to as operating in a cooling mode or fan 110 may be referred to as rotating in a cooling direction. Cooling package 108 may also include other components such as shrouds, mounts, frames, brackets, and transmissions which aid in securing fan 110 or transferring power to fan 110.

Figure 5:
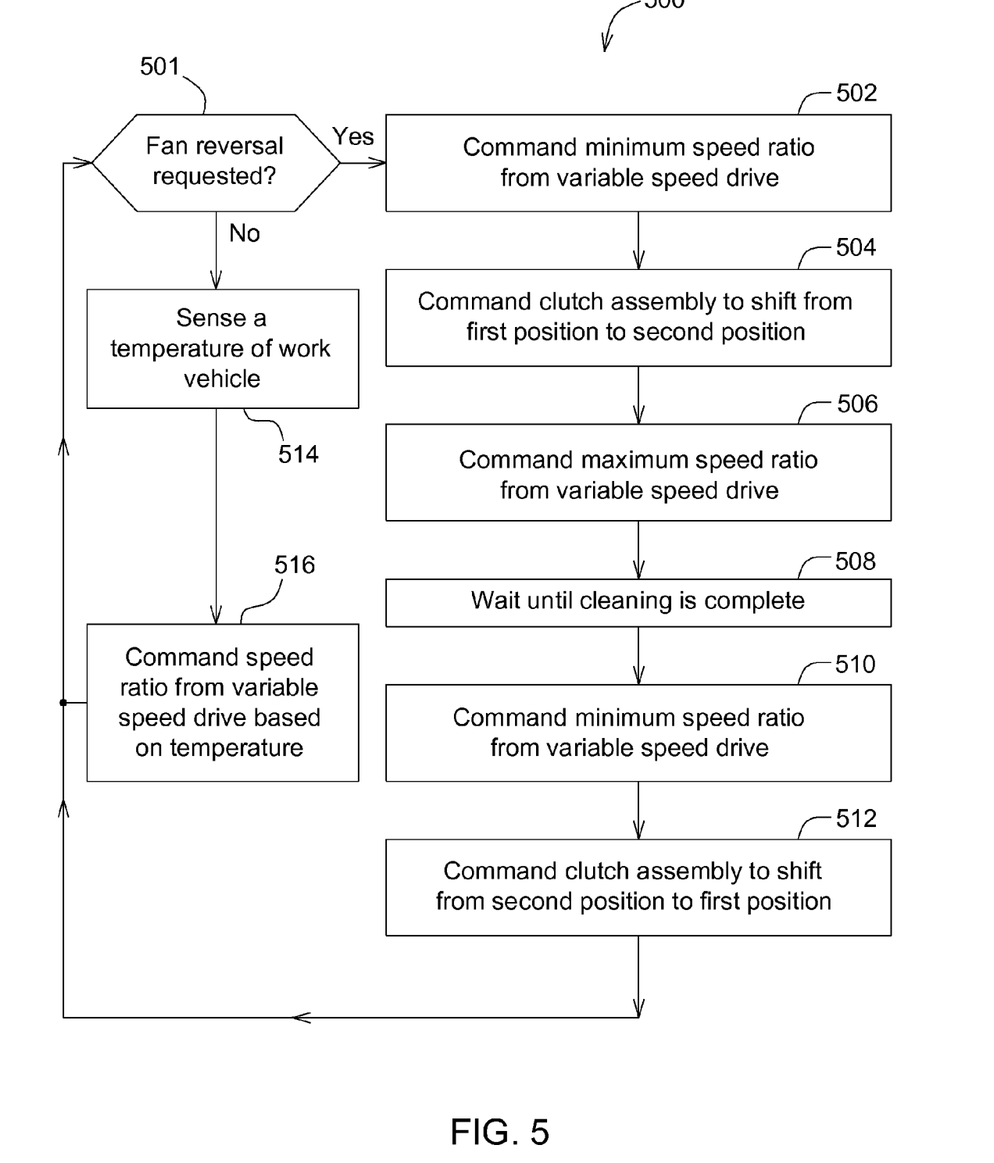
FIG. 5 is a schematic of a method of controlling a fan assembly.

Work vehicle 100 may be operated in environments with debris, such as dust, rock, plant material, and refuse. Such debris may become lodged on the outside of work vehicle 100 such that airflow through inlets 112 is restricted or blocked. Such debris may also become lodged within work vehicle 100 such that it restricts or blocks airflow through a heat exchanger or otherwise restricts or blocks airflow generated by fan 110. If work vehicle 100 operates in environments with such debris, it may be desirable for cooling package 110 to have the capability of rotating fan 110 in a second direction opposite the first direction (i.e., opposite the cooling direction). For example, the rotation of fan 110 is a second direction may draw air from the environment surrounding work vehicle 100 into the rear of work vehicle 100, through fan 110, through heat exchangers, and out inlets 112. When fan 110 is operating in this manner, it may be referred to as operating in a cleaning mode or fan 110 may be referred to as rotating in a cleaning direction. The reversal of fan 110 to operate it in the cleaning mode for a period of time may dislodge debris within or on the outside of work vehicle 100. After being operated in the cleaning mode for a period of time, the rotation of fan 110 may be reversed again so as to operate it in the cooling mode. Cooling package 108 may operate more efficiently after such a reversal cycle due to the reduction of debris within and on the outside of work vehicle 100. For example, cooling package 108 may utilize less input power to transfer the same amount of heat, transfer more heat with the same amount of input power, or may achieve some combination of increased heat transfer and reduced input power after debris have been dislodged by operating fan 110 in a cleaning mode. One example of a method of reversing fan 110 is illustrated in FIG. 5.

Work vehicle 100 may experience a range of duty cycles across a range of ambient temperatures. This combination may result in a range of heat generated by work vehicle 100 which must be dissipated by cooling package 108, and a range of heat transfer rates between fluids of work vehicle 100 and the surrounding environment. Fan 110 may be rotationally coupled to engine 106 at a fixed speed ratio in some embodiments. In this context, speed ratio refers to the ratio of the rotational speed of one component to the rotational speed of another component. This may be a cost effective way to have the heat dissipation of cooling package 108 vary to some degree with the duty cycle of work vehicle 100. Increased speeds of engine 106 may be associated with heavier duty cycles, which may require greater degrees of heat dissipation, but increased speeds of engine 106 also increase the speed of fan 110 and thereby increase the cooling provided by cooling package 108. In other embodiments, fan 110 may be rotationally coupled to engine 106 at a modifiable speed ratio. Such a modifiable speed ratio may improve the efficiency and performance of work vehicle 100, as it may reduce the frequency with which fan 110 is operated at a higher or lower speed than desirable for the cooling needs of work vehicle 100. A modifiable speed ratio may also be beneficial if fan 110 is capable of being reversed so as to operate in the cleaning mode. It may be beneficial to increase the rotational speed of fan 110 when fan 110 is operating in a cleaning mode. Such increased rotational speed may increase airflow or air velocity, which in turn may increase the effectiveness of the cleaning mode in dislodging debris within or on the outside of work vehicle 100. In some embodiments of the present disclosure, the speed ratio or the range of achievable speed ratios between fan 110 and engine 106 may be different in the cooling mode and the cleaning mode. For example, this may be used to enable higher rotational speeds for fan 110 when it is operating in a cleaning mode.

Figure 2:
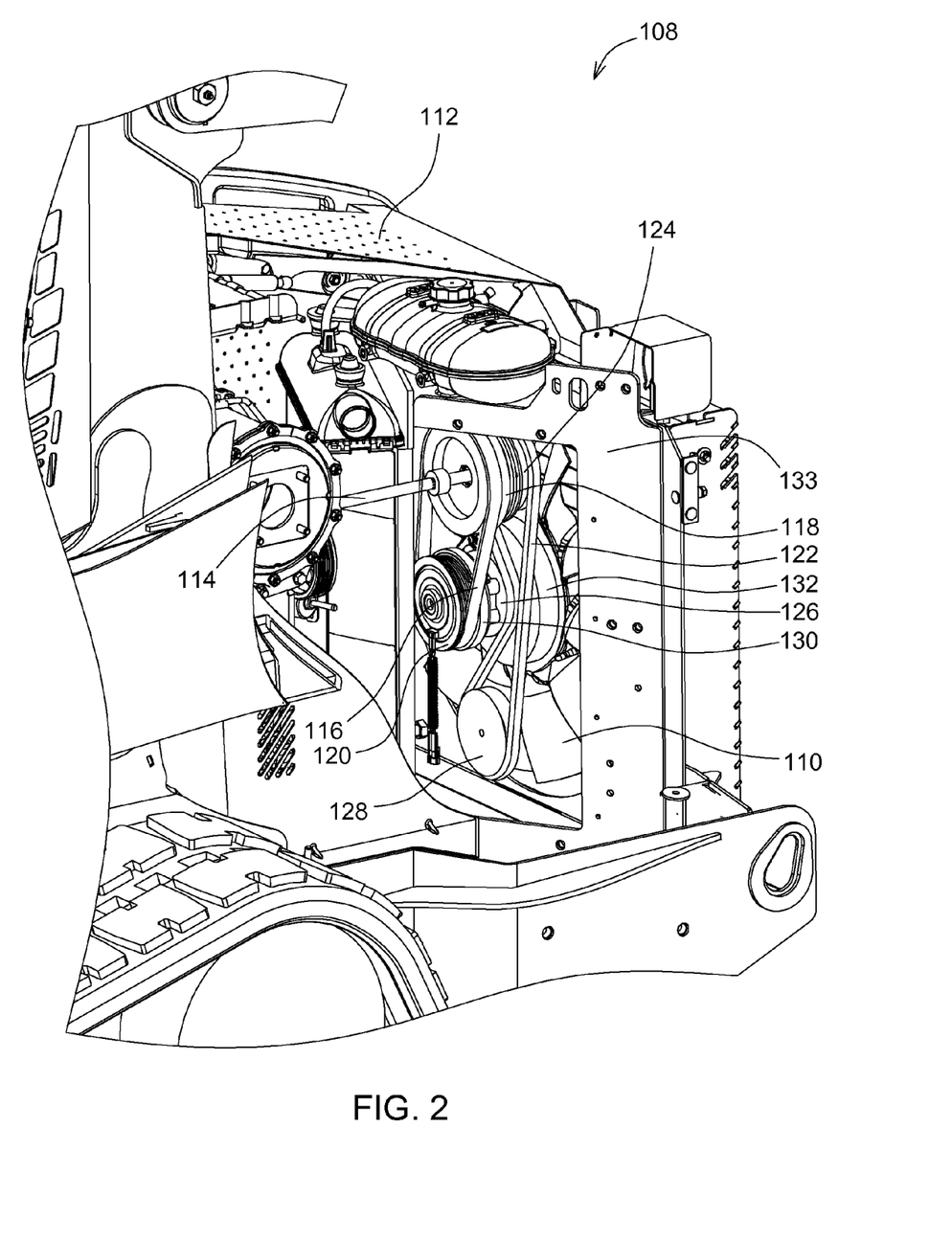
FIG. 2 is a partial perspective view of a work vehicle with components removed.

FIG. 2 illustrates cooling package 108, comprising fan 110, input shaft 114, first belt 116, first pulley 118, second pulley 120, second belt 122, third pulley 124, fourth pulley 126, idler pulley 128, clutch assembly 130, viscous clutch 132, and plate 133. Cooling package 108 is positioned at the rear of work machine 100, and is rotationally coupled to (i.e., driven by) engine 106 via input shaft 114. In this embodiment, input shaft 114 is rotationally coupled to engine 106 via a pulley engaged by an engine-driven belt. In alternative embodiments, input shaft 114 may be driven directly from the driveshaft of engine 106 or may be rotationally coupled to engine 106 through another form of mechanical transmission (e.g., gearing), electrical transmission (e.g., an electric motor powered by an inverter driven by engine 106), or hydraulic transmission (e.g., a hydraulic motor powered by a hydraulic pump driven by engine 106), to name but a few types of systems for transferring power from engine 106 to input shaft 114. In this embodiment, input shaft 114 is rotationally coupled to engine 106 at a fixed speed ratio, but in alternative embodiments the transmission between engine 106 and input shaft 114 may enable a modifiable speed ratio and may also enable a feature allowing for engine 106 to be disconnected from input shaft 114. In this embodiment, input shaft 114 extends from first pulley 118 toward the front of work vehicle 100 to rotationally couple to the remainder of the transmission rotationally coupling engine 106 and cooling package 108, but it may vary in length and configuration among embodiments of the present disclosure. In one alternative embodiment, as an example, input shaft 114 may only extend slightly forward of first pulley 118, such as if an electrical motor was rotationally coupled to input shaft 114 just forward of first pulley 118.

Each of first pulley 118, second pulley 120, third pulley 124, and fourth pulley 126 are mounted directly or indirectly on a shaft, which in turn is supported directly or indirectly by the fixed structure of cooling package 108, such as plate 133. For example, first pulley 118 and third pulley 124 are mounted directly to input shaft 114 in this embodiment. These shafts bear the load for the components mounted thereon, while also allowing such components to rotate as further described below. First pulley 118, second pulley 120, third pulley 124, and fourth pulley 126 are each referred to herein as a "pulley," but such a term is intended to encompass mechanical designs which are similarly configured to be engaged and rotated by belts (e.g., pulley, wheel, block, sprocket, sprocket-wheel, ring).

In an alternative embodiment, cooling package 108 may be arranged such that input shaft 114 is positioned lower within work vehicle 100. For example, input shaft 114 may be rotationally coupled to engine 106 below second pulley 120, clutch assembly 130, fourth pulley 126, and viscous clutch 132. This would effectively reverse the positions of input shaft 114, first pulley 118, and third pulley 124 with that of idler pulley 128, while maintaining the same functional configuration of pulleys and belts. Such an arrangement, or other alternatives to the arrangement shown in FIG. 2, may improve the packaging of cooling package 108 within work vehicle 100.

Figure 3A:
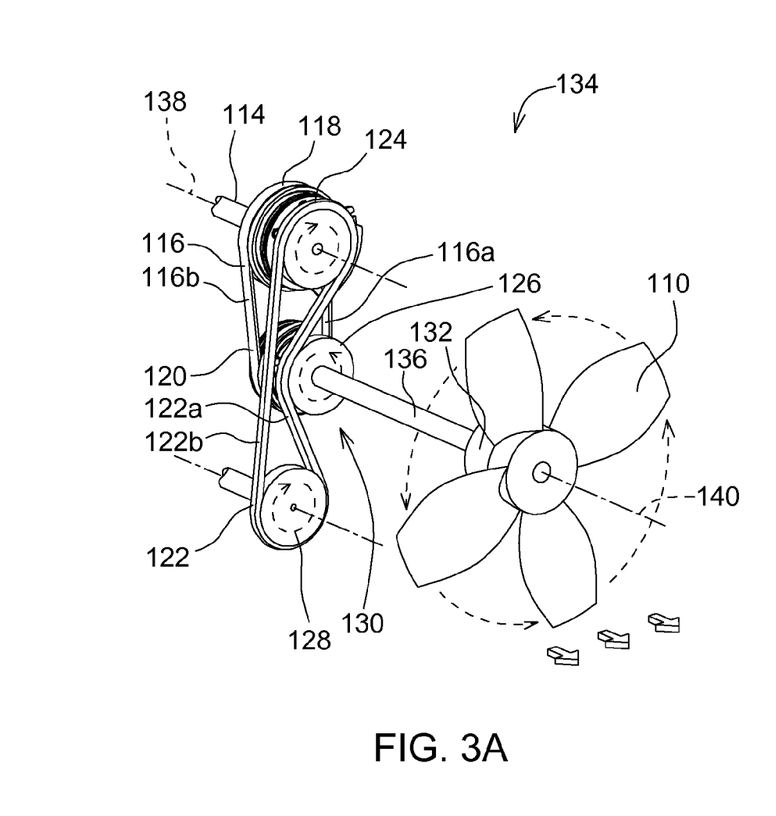
FIG. 3A is a perspective view of a fan assembly of the work vehicle operating in a cooling mode.
Figure 3B:
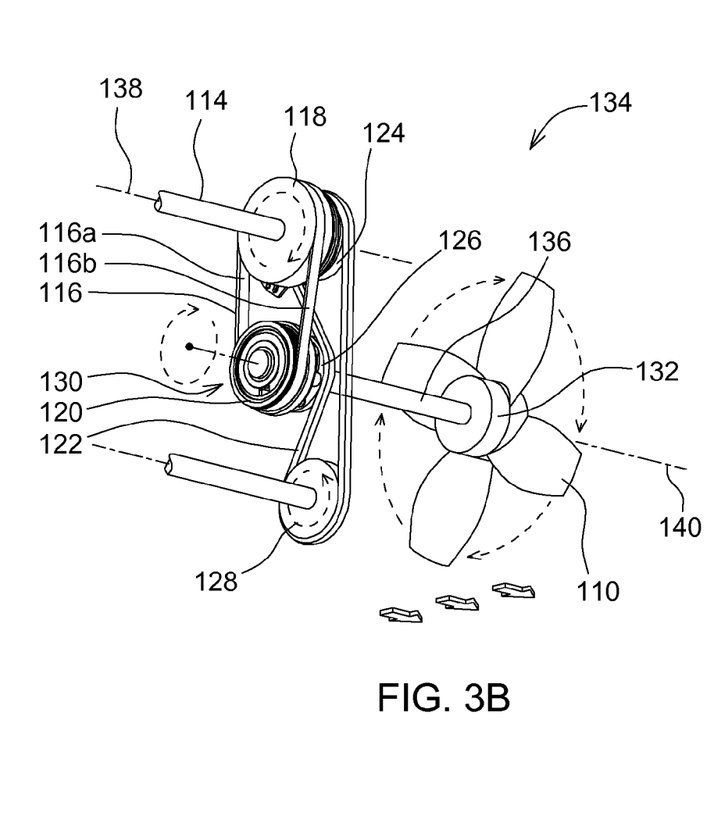
FIG. 3B is a perspective view of the fan assembly of FIG. 3A from an alternative perspective.
Figure 3C:
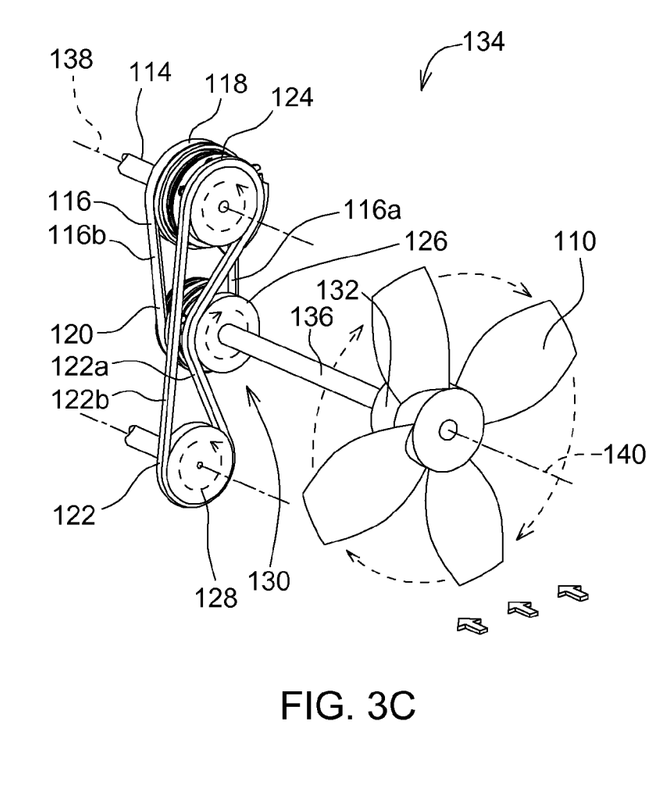
FIG. 3C is a perspective view of the fan assembly operating in a cleaning mode.
Figure 3D:
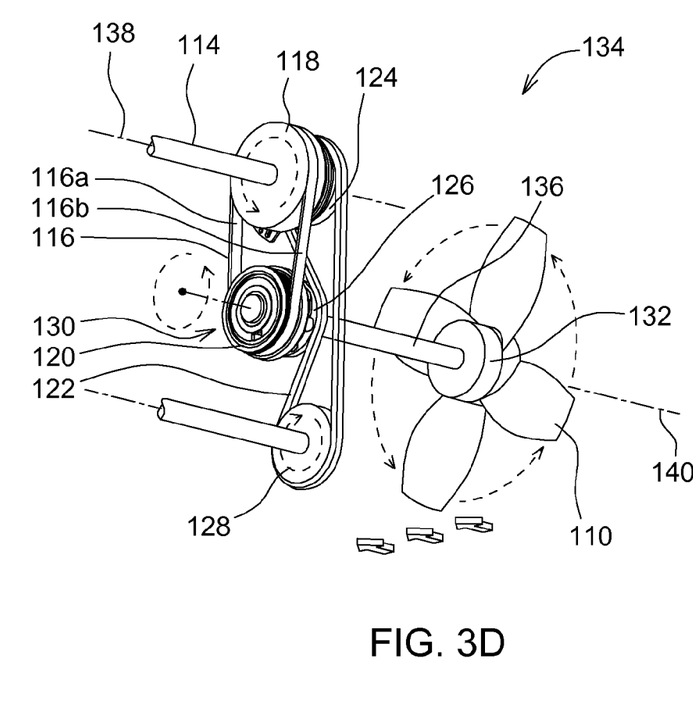
FIG. 3D is a perspective view of the fan assembly of FIG. 3C from an alternative perspective.

FIG. 3A, FIG. 3B, FIG. 3C, FIG. 3D are perspective views of fan assembly 134, having fan 110, input shaft 114, first belt 116, first pulley 118, second pulley 120, second belt 122, third pulley 124, fourth pulley 126, idler pulley 128, clutch assembly 130, viscous clutch 132, and output shaft 136. FIG. 3A and FIG. 3B show fan assembly 134 operating in a first mode (i.e., a cooling mode with fan 110 operating in a cooling direction), generating airflow out the rear of work vehicle 100. FIG. 3C and FIG. 3D show fan assembly 134 operating in a second mode (i.e., a cleaning mode with fan 110 operating in a cleaning direction), generating airflow into the rear of work vehicle 100.

Input shaft 114 is rotationally coupled to engine 106 and thereby mechanically transfers power to fan assembly 134. Input shaft 114 may be, for example, a steel shaft with features such as splines, threads, keyways, grooves, or the like to allow it to be mechanically coupled to other components. First pulley 118 and third pulley 124 are directly mounted on input shaft 114 and rotationally coupled to input shaft 114. Due to this mounting arrangement, first pulley 118, third pulley 124, and input shaft 114 are substantially co-axial along axis 138. In this context, substantially co-axial means that the axis through the center of each of first pulley 118, third pulley 124, and input shaft 114 are aligned closely enough that first pulley 118 and third pulley 124 may be rotated by input shaft 114 without disengaging or damaging first belt 116 or second belt 122. Minor deviations from axis 138 are likely due to manufacturing tolerances and mounting tolerances.

First belt 116 and second belt 122 are each referred to herein as a "belt," but such a term is intended to encompass mechanical designs which are similarly configured to flexibly transfer mechanical force across a distance (e.g., rubber belt, polymer belt, metal belt, chain, cable, track). In this embodiment, first belt 116 and second belt 122 each have a rectangular cross-section, and thus may be referred to as a flat belt. Each is comprised of multiple materials, for example a rubber molded over a fiber such as nylon, so as to provide a high-traction external surface which is supple while also providing tensile strength. In alternative embodiments, these belts may have any number of cross-sections (e.g., circle, triangle, square, rectangle, pentagon, irregular), the cross-section may not be uniform along the length of the belt so as to form ribbing or grooves, and the belts may be comprised of any number of materials (e.g., rubber, polymers, carbon fibers, natural fibers, steel, iron). For example, alternative embodiments may use V-belts, multi-groove belts, ribbed belts, or a combination of these for first belt 116 and second belt 122. First pulley 118, second pulley 120, third pulley 124, and fourth pulley 126 may be matched to the belt type used, for example by having an external groove which is shaped so as to mate with at least one side of first belt 116 or second belt 122. As another example, alternative embodiments may use chains for first belt 116 and second belt 122 and sprockets with teeth that mate with the links of the chains for first pulley 118, second pulley 120, third pulley 124, and fourth pulley 126. As another example, alternative embodiments may use a metal belt comprised of continuous strips of metal with members cross-linking the strips and ribbed wheels or sprockets which engage the cross-linking members for first pulley 118, second pulley 120, third pulley 124, and fourth pulley 126.

Each of first pulley 118 and second pulley 120 is engaged by first belt 116, such that the movement of first belt 116 imparts rotation to first pulley 118 and second pulley 120 and first belt 116 may transfer force between first pulley 118 and second pulley 120. First belt 116 comprises first side 116a and second side 116b opposite first side 116a. First belt 116 engages both first pulley 118 and second pulley 120 through an interface between first side 116a of first belt 116 and an outer surface of each of first pulley 118 and second pulley 120. Due to this configuration, first pulley 118 is rotationally coupled to second pulley 120 via first belt 116 so that first pulley 118 rotates in the same direction as second pulley 120.

Each of third pulley 124 and fourth pulley 126 is engaged by second belt 122, such that the movement of second belt 122 imparts rotation to third pulley 124 and fourth pulley 126 and second belt 122 may transfer force between third pulley 124 and fourth pulley 126. Second belt 122 engages third pulley 124 through an interface between first side 122a of second belt 122 and an outer surface of third pulley 124. Second belt 122 engages fourth pulley 126 through an interface between second side 122b of second belt 122 and an outer surface of fourth pulley 126. Due to this configuration, third pulley 122 is rotationally coupled to fourth pulley 126 via second belt 122 so that third pulley 122 rotates in the opposite direction of fourth pulley 126. Second belt 122 also engages idler pulley 128 through an interface between first side 122a of second belt 122 and an outer surface of idler pulley 128. Idler pulley 128 is positioned below fourth pulley 126 and is mounted separately from third pulley 124 and fourth pulley 126 so as to allow it to be freely driven by second belt 122. In this embodiment, idler pulley 128 provides a third rotational member which allows fourth pulley 126 to be engaged by second side 122b of second belt 122 with enough of a wrap angle (i.e., angle over which the belt engages the pulley) to transfer the necessary amount of torque.

Each of second pulley 120 and fourth pulley 126 is mounted to clutch assembly 130, which in turn is mounted on output shaft 136. In alternative embodiments, second pulley 120 and fourth pulley 126 may be integrally formed with clutch assembly 130. Second pulley 120 and fourth pulley 126 are thereby selectively rotationally coupled to output shaft 136 via clutch assembly 130. Output shaft 136 may be, for example, a steel shaft with features such as splines, threads, keyways, grooves, or the like to allow it to be mechanically coupled to other components. Second pulley 120, fourth pulley 126, and output shaft 136 are substantially co-axial along axis 140. The center of each of second pulley 120, fourth pulley 126, and output shaft 136 are aligned closely enough that second pulley 120 and fourth pulley 126 may be rotated by or about output shaft 136 without disengaging or damaging first belt 116 or second belt 122. Minor deviations from axis 140 are likely due to manufacturing tolerances and mounting tolerances.

In this embodiment, clutch assembly 130 is a multi-position clutch with two positions. In a first position of clutch assembly 130, second pulley 120 is rotationally coupled to output shaft 136 while fourth pulley 126 is not rotationally coupled to output shaft 136 and may rotate relative to output shaft 136. When fourth pulley 126 is not rotationally coupled to output shaft 136, some mechanical force may still be transmitted between the two due to friction and windage which may occur due to relative motion between the components. Clutch assembly 130 is therefore configured to selectively rotationally couple output shaft 136 to input shaft 114 via first pulley 118, first belt 116, and second pulley 120. This position of clutch assembly 130 is shown in FIG. 3A and FIG. 3B, as it causes airflow from a rear compartment of work vehicle 100, through fan 110, and out the rear of work vehicle 100. In a second position of clutch assembly 130, fourth pulley 126 is rotationally coupled to output shaft 136 while second pulley 120 is not rotationally coupled to output shaft 136 and may rotate relative to output shaft 136. Clutch assembly 130 is therefore configured to selectively rotationally couple output shaft 136 to input shaft 114 via third pulley 124, second belt 122, and fourth pulley 126. This position of clutch assembly 130 is shown in FIG. 3C and FIG. 3D, as it causes airflow into the rear of work vehicle 100, through fan 110, and into a rear compartment of work vehicle 100. In alternative embodiments, clutch assembly may be a multi-position clutch with a third, or neutral, position in which neither second pulley 120 nor fourth pulley 126 is rotationally coupled to output shaft 136, and each may rotate relative to output shaft 136 in such a neutral position.

Viscous clutch 132 is mounted at a longitudinal end (i.e., along axis 140) of output shaft 136 and thereby rotationally coupled to output shaft 136. In this embodiment, viscous clutch 132 is mounted to output shaft 136 by a keyed shape at the end of output shaft 136 which is inserted into a mating receptacle in viscous clutch 132 and locked into place, for example by a fastener. Fan 110 is mounted to viscous clutch 132 by a pattern of fasteners radially arranged around axis 140, fastening fan 110 against viscous clutch 132.

Viscous clutch 132 is a type of variable speed drive. Variable speed drives may be used to modify the speed ratio of fan 110 to output shaft 136 or any other rotating body which is rotationally coupled to output shaft 136, including input shaft 114 or engine 106. In alternative embodiments, the variable speed drive could be a viscous clutch, a slip clutch, eddy current clutch, or variable pulley, to name but a few examples of variable speed drives. Viscous clutch 132 may be controlled, for example by controller 107 on work vehicle 100 to which it is communicatively coupled, so as to vary this speed ratio. Viscous clutch 132 may receive a command from controller 107, including in the form of a voltage or current transmitted via a wire harness electrically connected to controller 107 and viscous clutch 132, and in response may alter its effective rotational viscous resistance. As the viscous resistance of viscous clutch 132 increases, its resistance to a differential between the rotational speed of fan 110 and the rotational speed of output shaft 136 increases, and, similarly, as the viscous resistance of viscous clutch 132 decreases, its resistance to a differential between the rotational speed of fan 110 and the rotational speed of output shaft 136 decreases. As viscosity increases, viscous clutch 132 may transmit more torque between output shaft 136 and fan 110 and thus the speed ratio of fan 110 to output shaft 136 (and input shaft 114 and engine 106) may increase. As viscosity decreases, viscous clutch 132 may transmit less torque between output shaft 136 and fan 110 and thus the speed ratio of fan 110 to output shaft 136 (and input shaft 114 and engine 106) may decrease. Viscous clutch 132 may be included with work vehicle 100 to allow the rotational speed of fan 110 to be uncoupled, at least partially, from the speed of engine 106 and separately controlled. This uncoupling and separate control may provide advantages in terms of permitting more energy efficient operation of fan 110, allowing for a reduced load by fan 110 on engine 106 during ignition, or increased control of heat dissipation and fluid temperatures during operation of work vehicle 100.

Fan 110 is rotationally coupled directly to viscous clutch 132, and therefore rotationally coupled to output shaft 136 and clutch assembly 130 via viscous clutch 132. In this embodiment, fan 110 is a multi-blade fixed pitch axial-flow fan, drawing air substantially from one side of fan 110 along axis 140 and directing it substantially to the opposite side of fan 110 along axis 140. When fan 110 is operating in a first direction (i.e., operating in a cooling direction or in a cooling mode), as shown in FIG. 3A and FIG. 3B, it draws air substantially from a forward direction around axis 140 from the interior of work vehicle 100 and directs such air rearward around axis 140 and eventually out of work vehicle 100. When fan 110 is operating in a second direction (i.e., operating in a cleaning direction or in a cleaning mode), as shown in FIG. 3C and FIG. 3D, it draws air substantially from the rear of work vehicle 100 around axis 140 and directs such air in a forward direction around axis 140 toward the interior of work vehicle 100. In alternative embodiments, fan 110 may have variable pitch blades which enable fan 110 to move different amounts of air at the same rotational speed.

Fan assembly 134 may enable fan 110 to be driven mechanically while still including both reversing and variable speed fan features. Achieving these capabilities in a mechanical design, instead of a hydraulic or electrical design for example, may provide cost, weight, complexity, or efficiency advantages for certain applications. Fan assembly 134 may also permit a modular approach to a cooling system. Fan assembly 134 may provide both reversing and variable speed fan features. Viscous clutch 132 may be removed to eliminate the variable speed fan feature without requiring a redesign of cooling package 108. Third pulley 124, second belt 122, fourth pulley 126, idler pulley 128, and clutch assembly 130 may be removed to eliminate the reversing fan feature without requiring a redesign of cooling package 108. Finally, both the reversing and variable speed fan features may be removed without requiring a redesign of cooling package 108. This modular approach may enable different fan assembly designs to be deployed for differing applications while maintaining a number of components in common and without significant redesigns to those components interfacing with the fan assembly.

Figure 4A:
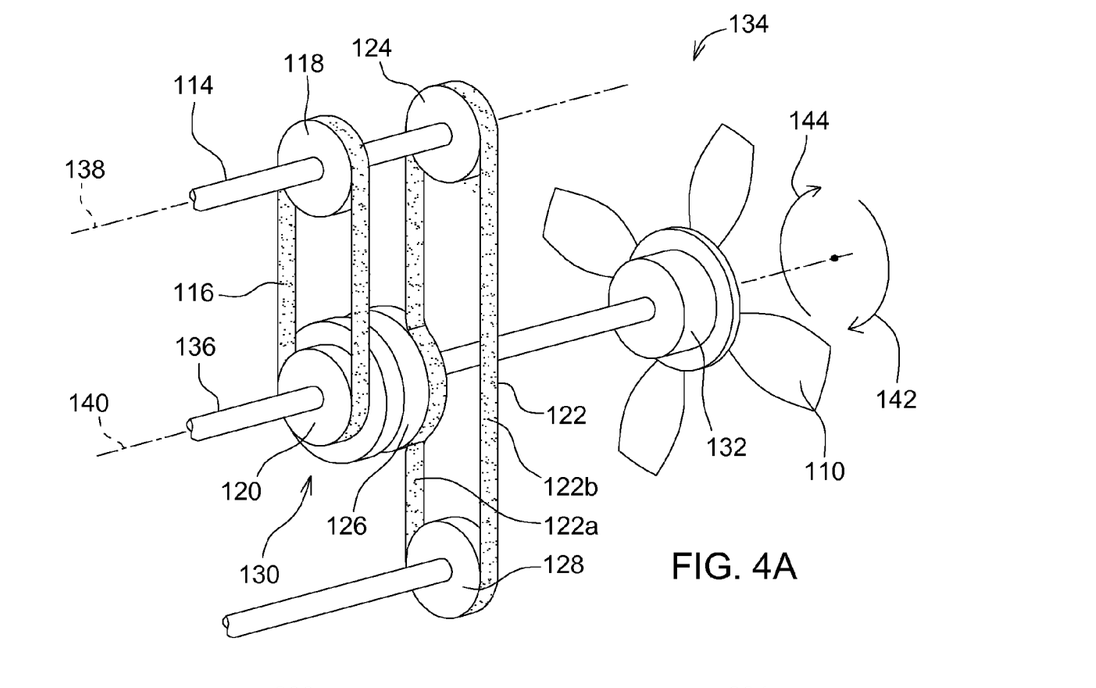
FIG. 4A is a simplified view of the fan assembly of FIG. 3A, FIG. 3B, FIG. 3C, and FIG. 3D.

FIG. 4A is a simplified view of fan assembly 134. Input shaft 114 is rotationally coupled to engine 106 and provides mechanical power to the remainder of fan assembly 134. First pulley 118 and third pulley 124 are each mounted to input shaft 114. First pulley 118 and second pulley 120 are each engaged by first belt 116 so as to rotate in the same direction as each other. Third pulley 124 and fourth pulley 126 are each engaged by second belt 122 so as to rotate in opposite directions from each other. In this embodiment, this is achieved by third pulley 124 being engaged by first surface 122a of second belt 122, and fourth pulley 126 being engaged by second surface 122b of second belt 122. Second belt 122 also engages idler pulley 128. Clutch assembly 130 is mounted on output shaft 136, and second pulley 120 and fourth pulley 126 are mounted to clutch assembly 130. Clutch assembly 130 is a multi-position clutch with a first position in which second pulley 120 is rotationally coupled to output shaft 136 (and fourth pulley 126 is not) and a second position in which fourth pulley 126 is rotationally coupled to output shaft 136 (and first pulley 118 is not). Viscous clutch 132 is also mounted and rotationally coupled to output shaft 136. Fan 110 is rotationally coupled to output shaft 136 via viscous clutch 132, enabling viscous clutch 132 to modify the speed ratio between fan 110 and output shaft 136, input shaft 114, and engine 106.

When clutch assembly 130 is in a first position (i.e., a cooling mode), input shaft 114 is rotationally coupled to output shaft 136 via first pulley 118, first belt 116, and second pulley 120, causing fan 110 to rotate in first fan direction 144 (i.e., a cooling direction). When clutch assembly 130 is in a second position (i.e., a cleaning mode), input shaft 114 is rotationally coupled to output shaft 136 via third pulley 124, second belt 122, and fourth pulley 126, causing fan 110 to rotate in second fan direction 142 (i.e., a cleaning direction). In both the cooling mode and the cleaning mode, the speed ratio between fan 110 and output shaft 136 may be modified by viscous clutch 132.

Figure 4B:
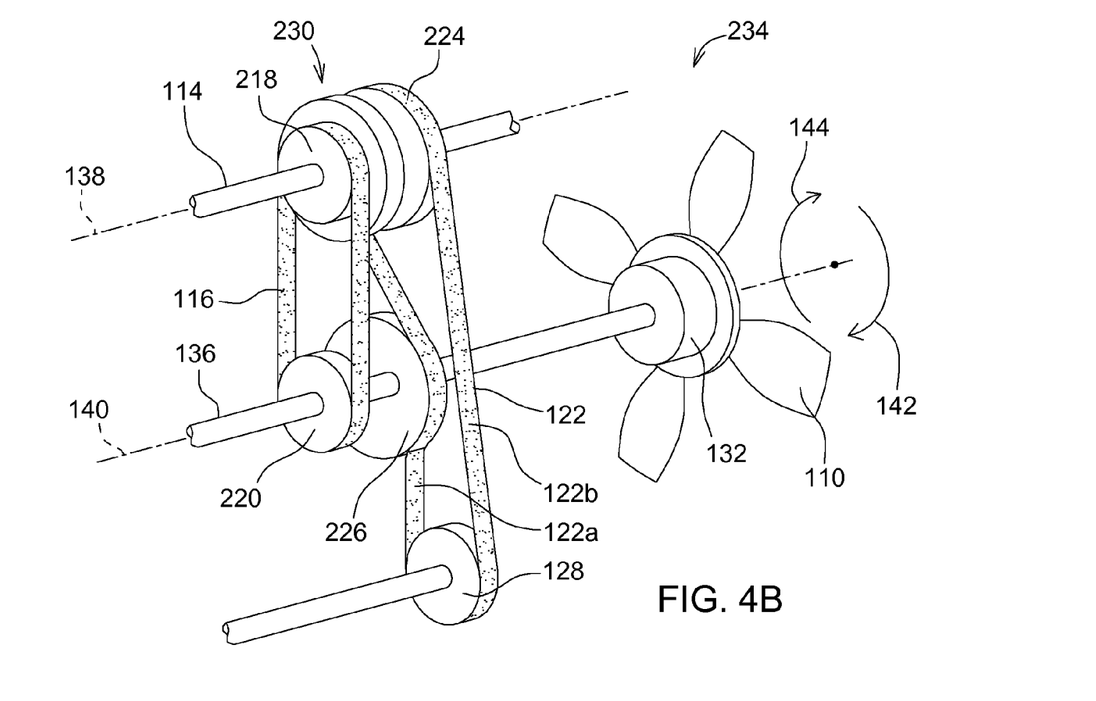
FIG. 4B is a simplified view of an alternative embodiment of a fan assembly.

FIG. 4B is a simplified view of an alternative embodiment, fan assembly 234. First pulley 218 and third pulley 224 are mounted and rotationally coupled to clutch assembly 230, which is mounted and rotationally coupled to input shaft 114. Clutch assembly 230 is a multi-position clutch with a first position in which first pulley 218 is rotationally coupled to input shaft 114 (and third pulley 224 is not) and a second position in which third pulley 224 is rotationally coupled to input shaft 114 (and first pulley 218 is not). Second pulley 220 and fourth pulley 226 are mounted and rotationally coupled to output shaft 136. First pulley 218 and second pulley 220 are each engaged by first belt 116 so as to rotate in the same direction as each other. Third pulley 224 and fourth pulley 226 are each engaged by second belt 122 so as to rotate in opposite directions from each other. In this embodiment, this is achieved by third pulley 224 being engaged by first surface 122a of second belt 122, and fourth pulley 226 being engaged by second surface 122b of second belt 122. Second belt 122 also engages idler pulley 128. Viscous clutch 132 is mounted and rotationally coupled to output shaft 136. Fan 110 is rotationally coupled to output shaft 136 via viscous clutch 132, enabling viscous clutch 132 to modify the speed ratio between fan 110 and output shaft 136, input shaft 114, and engine 106. This embodiment uses the multi-position clutch of fan assembly 134 but positions it on input shaft 114 instead of output shaft 136. Such a configuration may provide packaging benefits in certain applications.

When clutch assembly 230 is in a first position (i.e., a cooling mode), input shaft 114 is rotationally coupled to output shaft 136 via first pulley 218, first belt 116, and second pulley 220, causing fan 110 to rotate in first fan direction 144 (i.e., a cooling direction). When clutch assembly 230 is in a second position (i.e., a cleaning mode), input shaft 114 is rotationally coupled to output shaft 136 via third pulley 224, second belt 122, and fourth pulley 226, causing fan 110 to rotate in second fan direction 142 (i.e., a cleaning direction). In both the cooling mode and the cleaning mode, the speed ratio between fan 110 and output shaft 136 may be modified by viscous clutch 132.

Figure 4C:
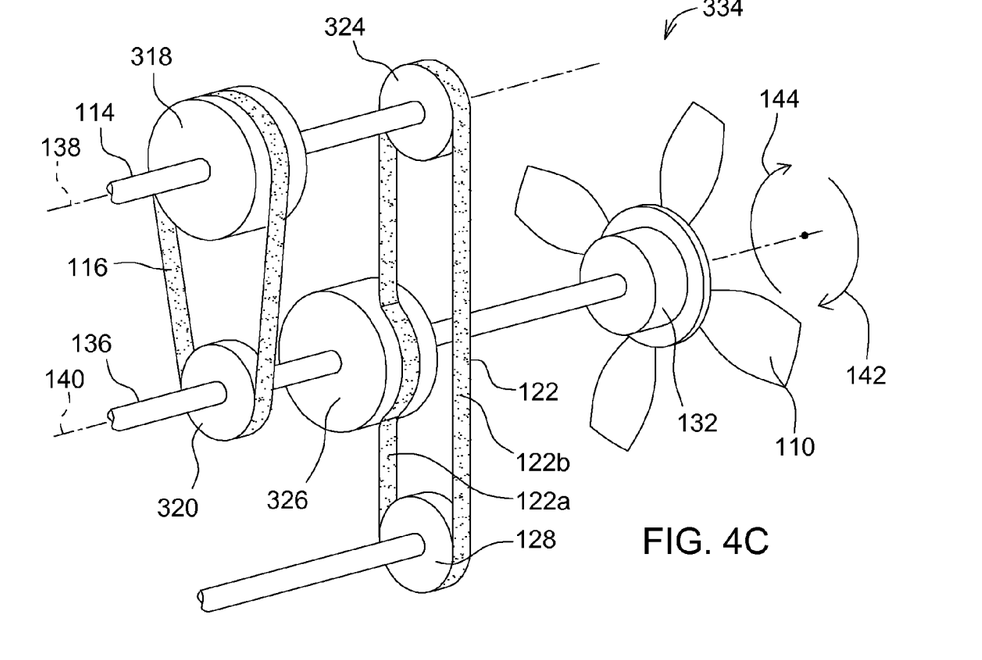
FIG. 4C is a simplified view of an alternative embodiment of a fan assembly.

FIG. 4C is a simplified view of an alternative embodiment, fan assembly 334, which utilizes a physically separated first clutch and a second clutch for the clutch assembly instead of a multi-position clutch. First clutch-pulley 318 includes a pulley portion that is engaged by first belt 116 and a clutch portion that is mounted and rotationally coupled to input shaft 114. First clutch-pulley 318 may be engaged, thereby rotationally coupling input shaft 114 and first belt 116, or it may be disengaged in which case input shaft 114 is not rotationally coupled to first belt 116 via first clutch-pulley 318. Second pulley 320 is also engaged by first belt 116 and is mounted and rotationally coupled to output shaft 136. Third pulley 324 is mounted and rotationally coupled to input shaft 114. Second clutch-pulley 326 includes a pulley portion that is engaged by second belt 116 and a clutch portion that is mounted on output shaft 136. Second clutch-pulley 326 may be engaged, thereby rotationally coupling output shaft 136 and second belt 122, or it may be disengaged in which case output shaft 136 is not rotationally coupled to second belt 122 via second clutch-pulley 326. First pulley-clutch 318 and second pulley 320 are each engaged by first belt 116 so as to rotate in the same direction as each other. In this embodiment, this is achieved by first pulley-clutch 318 and second pulley 320 being engaged by the same surface of first belt 116. Third pulley 324 and second pulley-clutch 328 are each engaged by second belt 122 so as to rotate in opposite directions from each other. In this embodiment, this is achieved by third pulley 324 being engaged by first surface 122a of second belt 122, and second pulley-clutch 326 being engaged by second surface 122b of second belt 122. Second belt 122 also engages idler pulley 128. Viscous clutch 132 is mounted and rotationally coupled to output shaft 136. Fan 110 is rotationally coupled to output shaft 136 via viscous clutch 132, enabling viscous clutch 132 to modify the speed ratio between fan 110 and output shaft 136, input shaft 114, and engine 106. This embodiment utilizes two physically separated clutches for the clutch assembly, with one mounted to input shaft 114 and one mounted to output shaft 136, instead of the multi-position clutch of fan assembly 134. Such a configuration may provide packaging or cost benefits in certain applications.

When first clutch-pulley 318 is engaged and second clutch-pulley 326 is disengaged (i.e., a cooling mode), input shaft 114 is rotationally coupled to output shaft 136 via first clutch-pulley 318, first belt 116, and second pulley 320, causing fan 110 to rotate in first fan direction 144 (i.e., a cooling direction). When second clutch-pulley 326 is engaged and first clutch-pulley 318 is disengaged (i.e., a cleaning mode), input shaft 114 is rotationally coupled to output shaft 136 via third pulley 324, second belt 122, and second clutch-pulley 326, causing fan 110 to rotate in second fan direction 142 (i.e., a cleaning direction). In both the cooling mode and the cleaning mode, the speed ratio between fan 110 and output shaft 136 may be modified by viscous clutch 132.

Figure 4D:
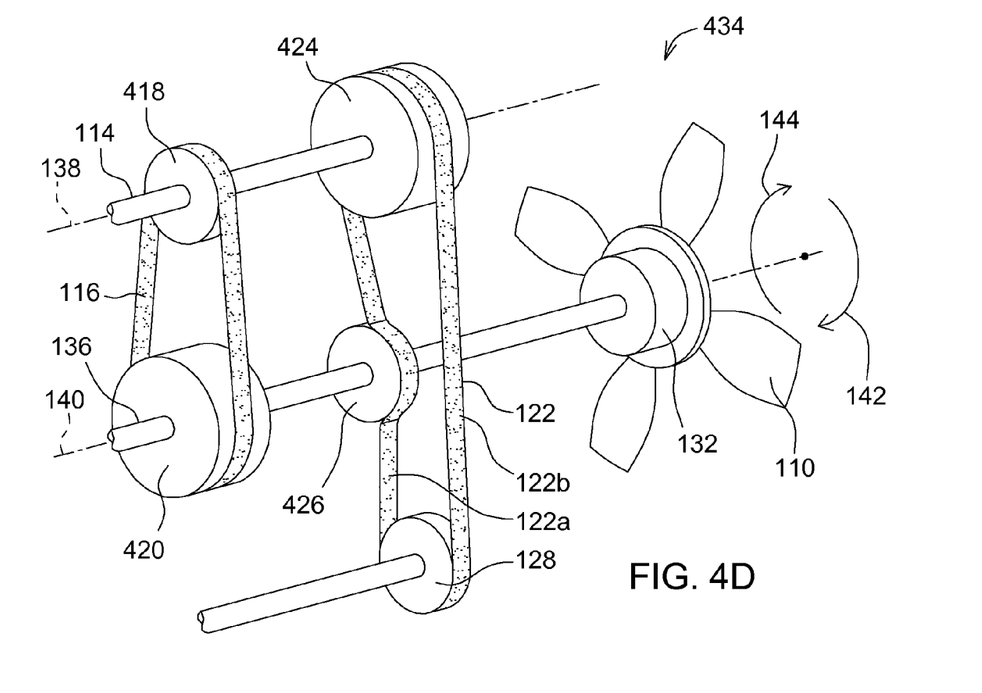
FIG. 4D is a simplified view of an alternative embodiment of a fan assembly.

FIG. 4D is a simplified view of an alternative embodiment, fan assembly 434, which utilizes a physically separated first clutch and a second clutch for the clutch assembly instead of a multi-position clutch. First pulley 418 is engaged by first belt 116 and is mounted and rotationally coupled to input shaft 114. First clutch-pulley 420 includes a pulley portion that is engaged by first belt 116 and a clutch portion that is mounted and rotationally coupled to output shaft 136. First clutch-pulley 420 may be engaged, thereby rotationally coupling output shaft 136 and first belt 116, or it may be disengaged in which case output shaft 136 is not rotationally coupled to first belt 116 via first clutch-pulley 420. Second clutch-pulley 424 includes a pulley portion that is engaged by second belt 116 and a clutch portion that is mounted and rotationally coupled to input shaft 114. Second clutch-pulley 424 may be engaged, thereby rotationally coupling input shaft 114 and second belt 122, or it may be disengaged in which case input shaft 114 is not rotationally coupled to second belt 122 via second clutch-pulley 424. Fourth pulley 426 is mounted and rotationally coupled to output shaft 136. First pulley 418 and first pulley-clutch 420 are each engaged by first belt 116 so as to rotate in the same direction as each other. In this embodiment, this is achieved by first pulley 418 and first pulley-clutch 420 being engaged by the same surface of first belt 116. Second pulley-clutch 424 and fourth pulley 426 are each engaged by second belt 122 so as to rotate in opposite directions from each other. In this embodiment, this is achieved by second pulley-clutch 424 being engaged by first surface 122a of second belt 122, and fourth pulley 426 being engaged by second surface 122b of second belt 122. Second belt 122 also engages idler pulley 128. Viscous clutch 132 is mounted and rotationally coupled to output shaft 136. Fan 110 is rotationally coupled to output shaft 136 via viscous clutch 132, enabling viscous clutch 132 to modify the speed ratio between fan 110 and output shaft 136, input shaft 114, and engine 106. This embodiment utilizes two physically separated clutches for the clutch assembly, with one mounted to input shaft 114 and one mounted to output shaft 136, instead of the multi-position clutch of fan assembly 134. Such a configuration may provide packaging or cost benefits in certain applications.

When first clutch-pulley 420 is engaged and second clutch-pulley 424 is disengaged (i.e., a cooling mode), input shaft 114 is rotationally coupled to output shaft 136 via first pulley 418, first belt 116, and first clutch-pulley 420, causing fan 110 to rotate in first fan direction 144 (i.e., a cooling direction). When second clutch-pulley 424 is engaged and first clutch-pulley 420 is disengaged (i.e., a cleaning mode), input shaft 114 is rotationally coupled to output shaft 136 via second clutch-pulley 424, second belt 122, and fourth pulley 426, causing fan 110 to rotate in second fan direction 142 (i.e., a cleaning direction). In both the cooling mode and the cleaning mode, the speed ratio between fan 110 and output shaft 136 may be modified by viscous clutch 132.

In yet other embodiments, multi-position clutches may be replaced by separate clutches located on the same shaft. For example, first pulley 118 may be mounted to a first clutch and third pulley 124 may be mounted to a second clutch. As another example, second pulley 120 may be mounted to a first clutch and fourth pulley 126 may be mounted to a second clutch. For such embodiments, the cooling mode for fan 110 may occur when the first clutch (i.e., the clutch on first pulley 118 or second pulley 120) is engaged and the second clutch (i.e., the clutch on third pulley 124 and fourth pulley 126) is disengaged. The cleaning mode for fan 110 may occur when the first clutch (i.e., the clutch on first pulley 118 or second pulley 120) is disengaged and the second clutch (i.e., the clutch on third pulley 124 and fourth pulley 126) is engaged.

FIG. 5 is a schematic of control system 500 for controlling fan assembly 134. Control system 500 may be performed by controller 107 located on work vehicle 100, which is in communication with clutch assembly 130 and viscous clutch 132. Control system 500 may begin with step 501, in which controller 107 determines whether a fan reversal is requested. Controller 107 may determine this through a number of different procedures, including by sensing whether an operator in operator station 110 has actuated an input (e.g., a switch, knob, or button by itself or as part of a display), receiving a command from a remote controller (e.g., a site manager, or a server), or receiving a command from another controller or another control system which determines when to reverse fan 110. If a fan reversal is requested, step 502 may be performed next. If a fan reversal is not requested, step 514 may be performed next. Step 502, step 504, step 506, step 508, step 510, and step 512 may be performed while fan 110 switches from operating in the cooling mode (rotating in the cooling direction), to operating in the cleaning mode (and rotating in the cleaning direction), back to operating in the cooling mode. Step 514 and step 516 may be performed while fan 110 is operating in the cooling mode (rotating in the cooling direction).

If controller 107 received a request to reverse the fan in step 501, step 502 may be performed next and controller 107 may command viscous clutch 132 to reduce the speed ratio between fan 110 and output shaft 136 to a minimum. This command may take the form of an electrical signal communicated from controller 107 to viscous clutch 132 via a wiring harness. This step is optional, but may aid in reducing the rotational speed of fan 110 and therefore the amount of kinetic energy associated with fan 110 and rotationally coupled components. This step may be used to reduce the speed differentials and forces that clutch assembly 130 may need to accommodate in the next steps. Step 502 may include waiting a period of time to allow fan 110 to slow to its minimum rotational speed.

In step 504, controller 107 commands clutch assembly 130 to shift from its first position to its second position. This command may take the form of an electrical signal communicated from controller 107 to clutch assembly 130 via a wiring harness. In alternative embodiments, this command may take the form of an electrical signal communicated from controller 107 to a hydraulic valve, which in turn may modify a hydraulic pressure communicated to clutch assembly 130. Step 504 may include waiting a period of time to allow clutch assembly 130 to complete its shift.

In step 506, controller 107 may command viscous clutch 132 to increase the speed ratio between fan 110 and output shaft 136 to a maximum. This step is optional, but may aid in increasing the rotational speed of fan 110 to increase airflow and air velocity through work vehicle 100, which may increase the effectiveness of the cleaning mode.

In step 508, controller 107 may wait for a period of time for the cleaning mode to complete. This period of time may be pre-set, operator-selectable, or calculated based on factors such as the length of time since the last cleaning mode was executed or the duty cycle experienced by work vehicle 100 since the last cleaning mode was executed.

In step 510, controller 107 may command viscous clutch 132 to reduce the speed ratio between fan 110 and output shaft 136 to a minimum. This step is optional, but may aid in reducing the rotational speed of fan 110 and therefore the amount of kinetic energy associated with fan 110 and rotationally coupled components. This step may be used to reduce the speed differentials and forces that clutch assembly 130 may need to accommodate in the next steps. Step 510 may include waiting a period of time to allow fan 110 to slow to its minimum rotational speed.

In step 512, controller 107 commands clutch assembly 130 to shift from its second position to its first position. Step 504 may include waiting a period of time to allow clutch assembly 130 to complete its shift.

If controller 107 did not receive a request to reverse the fan in step 501, step 514 may be performed next and controller 107 may sense a temperature of work vehicle 100 by receiving a signal from a temperature sensor. For example, controller 107 may receive a signal from a temperature sensor configured to measure the temperature of hydraulic fluid of work vehicle 100. In step 516, controller 107 may command variable speed drive 132 to a speed ratio based on the temperature sensed in step 514. This allows the speed ratio between fan 110 and output shaft 136 to be modified so as to operate fan 110 at a speed which balances acceptable operating temperatures, fan power, and fan noise. Step 514 and step 516 are optional and may not be included in every embodiment of the present disclosure. For example, if an embodiment of the present disclosure does not contain variable speed drive 132, there may be no need to perform step 514 and step 516.

Control system 500 may be adapted to alternative embodiments of the present disclosure, including fan assembly 234, fan assembly 334, and fan assembly 434. For example, instead of commanding clutch assembly 130 to shift from a first position to a second position in step 504, controller 107 may instead command the disengagement of first clutch-pulley 318, optionally wait for a period of time in this neutral position, and then command the engagement of second clutch pulley 326 for fan assembly 334.

While the disclosure has been illustrated and described in detail in the drawings and foregoing description, such illustration and description is not restrictive in character, it being understood that illustrative embodiment(s) have been shown and described and that all changes and modifications that come within the spirit of the disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A fan assembly comprising:
    a first belt;
    a first pulley engaged by the first belt;
    a second pulley engaged by the first belt, the second pulley rotationally coupled to the first pulley via the first belt so as to rotate in the same direction as the first pulley;
    a second belt;
    a third pulley engaged by the second belt;
    a fourth pulley engaged by the second belt, the fourth pulley rotationally coupled to the third pulley via the second belt so as to rotate in the opposite direction of the third pulley;
    an input shaft configured to receive power to the fan assembly and direct it to at least one of the first pulley and the third pulley, the first pulley and the third pulley mounted on the input shaft;
    an output shaft configured to be powered by at least one of the second pulley and the fourth pulley, the second pulley and the fourth pulley mounted on the output shaft;
    a fan rotationally coupled to the output shaft; and
    a clutch assembly, the clutch assembly configured to selectively rotationally couple the output shaft to the input shaft via the first pulley, the first belt, and the second pulley for multiple rotations of the input shaft and output shaft, the clutch assembly configured to selectively rotationally couple the output shaft to the input shaft via the third pulley, the second belt, and the fourth pulley for multiple rotations of the input shaft and output shaft.

2. The fan assembly of claim 1, wherein the clutch assembly comprises a first clutch and a second clutch, the first pulley is selectively rotationally coupled to the input shaft via the first clutch, the second pulley is rotationally coupled to the output shaft, the third pulley is selectively rotationally coupled to the input shaft via the second clutch, and the fourth pulley is rotationally coupled to the output shaft.

3. The fan assembly of claim 1, wherein the clutch assembly comprises a first clutch and a second clutch, the first pulley is selectively rotationally coupled to the input shaft via the first clutch, the second pulley is rotationally coupled to the output shaft, the third pulley is rotationally coupled to the input shaft, and the fourth pulley is selectively rotationally coupled to the output shaft via the second clutch.

4. The fan assembly of claim 1, wherein the clutch assembly comprises a first clutch and a second clutch, the first pulley is rotationally coupled to the input shaft, the second pulley is selectively rotationally coupled to the output shaft via the first clutch, the third pulley is selectively rotationally coupled to the input shaft via the second clutch, and the fourth pulley is rotationally coupled to the output shaft.

5. The fan assembly of claim 1, wherein the clutch assembly comprises a first clutch and a second clutch, the first pulley is rotationally coupled to the input shaft, the second pulley is selectively rotationally coupled to the output shaft via the first clutch, the third pulley is rotationally coupled to the input shaft, and the fourth pulley is selectively rotationally coupled to the output shaft via the second clutch.

6. The fan assembly of claim 1, wherein the clutch assembly is a multi-position clutch, the input shaft is rotationally coupled to the first pulley when the multi-position clutch is in a first position, the input shaft is rotationally coupled to the third pulley when the multi-position clutch is in a second position, the second pulley is rotationally coupled to the output shaft, and the fourth pulley is rotationally coupled to the output shaft.

7. The fan assembly of claim 1, wherein the clutch assembly is a multi-position clutch, the output shaft is rotationally coupled to the second pulley when the multi-position clutch is in a first position, the output shaft is rotationally coupled to the fourth pulley when the multi-position clutch is in a second position, the first pulley is rotationally coupled to the input shaft, and the third pulley is rotationally coupled to the input shaft.

8. The fan assembly of claim 1, further comprising a variable speed drive, wherein the fan is rotationally coupled to the output shaft via the variable speed drive and the variable speed drive is configured to modify a speed ratio between the fan and the input shaft.

9. The fan assembly of claim 6, further comprising a variable speed drive, wherein the fan is rotationally coupled to the output shaft via the variable speed drive and the variable speed drive is configured to modify a speed ratio between the fan and the input shaft.

10. The fan assembly of claim 7, further comprising a variable speed drive, wherein the fan is rotationally coupled to the output shaft via the variable speed drive and the variable speed drive is configured to modify a speed ratio between the fan and the input shaft.

11. The fan assembly of claim 1, wherein the input shaft, the first pulley, and the third pulley are substantially co-axial and the second pulley, the fourth pulley, and the output shaft are substantially co-axial.

12. The fan assembly of claim 1, wherein the first belt comprises a first side and a second side, the first pulley is engaged by and contacts the first side of the first belt, the second pulley is engaged by and contacts the first side of the first belt, the second belt comprises a first side and a second side, the third pulley is engaged by and contacts the first side of the second belt, and the fourth pulley is engaged by and contacts the second side of the second belt.

13. The fan assembly of claim 12, further comprising a variable speed drive, wherein the fan is rotationally coupled to the output shaft via the variable speed drive and the variable speed drive is configured to modify a speed ratio between the fan and the input shaft.

14. The fan assembly of claim 12, further comprising an engine and a variable speed drive, wherein the engine is rotationally coupled to the input shaft via the variable speed drive and the variable speed drive is configured to modify a speed ratio between the input shaft and the engine.

* * * * *